United States Patent [19]

Kawahara et al.

[11] Patent Number: 5,188,395
[45] Date of Patent: Feb. 23, 1993

[54] WATERPROOF RECORDING MATERIAL HAVING GROUND PATTERNS AND ITS MANUFACTURING METHOD

[75] Inventors: Hiroshi Kawahara; Noriaki Okunaka; Mitsuru Kobayashi; Isao Tokuno; Shuzo Ohara, all of Osaka, Japan

[73] Assignee: Goyo Paper Working Co., Ltd., Osaka, Japan

[21] Appl. No.: 452,667

[22] Filed: Dec. 19, 1989

[30] Foreign Application Priority Data

Dec. 21, 1988 [JP] Japan .................. 63-323939
Oct. 4, 1989 [JP] Japan .................. 1-91267

[51] Int. Cl.5 ............................................ B42D 15/00
[52] U.S. Cl. ................................. 283/113; 283/107; 283/110; 283/904
[58] Field of Search ............... 283/107, 109, 110, 111, 283/904, 113

[56] References Cited

U.S. PATENT DOCUMENTS

| | | | |
|---|---|---|---|
| 4,307,899 | 12/1981 | Hoppe ..................... | 283/113 X |
| 4,451,068 | 5/1984 | Hall et al. ................ | 283/111 X |
| 4,456,639 | 6/1984 | Drower et al. ........... | 283/107 X |
| 4,469,725 | 9/1984 | Fischer et al. ........... | 283/113 X |
| 4,506,916 | 3/1985 | Kuhl ........................ | 253/111 X |
| 4,856,857 | 8/1989 | Takeuchi et al. ........ | 253/904 X |

FOREIGN PATENT DOCUMENTS 2366658 4/1978 France .................. 253/113

OTHER PUBLICATIONS

Modern Plastics Encyclopedia, 1980-1981, pp. 454-455.
Pulp and Pater Chemistry and Chemical Technology, Third Edition, vol. IV, Wiley & Sons, 1983, pp. 2516-2519.

Primary Examiner—Paul A. Bell
Attorney, Agent, or Firm—Armstrong, Westerman, Hattori, McLeland & Naughton

[57] ABSTRACT

The present invention provides a waterproof recording material having ground patterns characterized in that the ground patterns are imparted to the surface of a film of a resin composition comprising a thermoplastic synthetic resin and a filler. According to this invention, it is possible to provide a fine-looking recording material which, besides excellent waterproofness and recording property, may have various stages of surface properties and visual effects imparted by means of the ground patterns. The waterproof recording material having ground patterns of the present invention is suitable as a material of valuable securities and the like, facilitating true/false discrimination and preventing illegal use or abuse thereof by altering, falsification et cetera.

5 Claims, 2 Drawing Sheets

FIG. 3
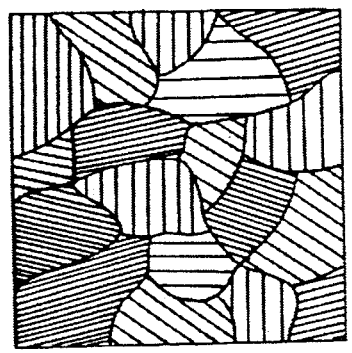
FIG. 4
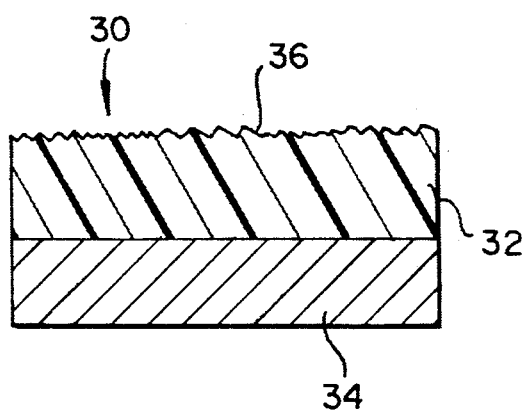
FIG. 5

WATERPROOF RECORDING MATERIAL HAVING GROUND PATTERNS AND ITS MANUFACTURING METHOD

BACKGROUND OF THE INVENTION

1. Field of the Invention

The present invention relates to a waterproof recording material and its manufacturing method and, more particularly, relates to a waterproof recording material, which can be manufactured cheaply and easily, having imparted thereto various surface properties such as irregularities, wettability, printability, writability and coating property and visual effects such as stereo patterns or perspective patterns provided by combination of stepwise control of luster and tone.

Waterproof materials of the present invention are particularly suited as security recording materials enabling one to distinguish false from true valuable securities or the like or ensuring against illegal use or use for evil purposes such as altering or falsifying.

2. Description of the Prior Art

As waterproof recording materials, synthetic papers have hitherto been used but so far those used are, for instance, (1) a PET film with its surface roughened by sandblasting, (2) a synthetic resin film with its surface coated with some inorganic chemical, (3) a mixture of a polypropylene resin and an inorganic chemical filmed and drawn or orientated, (4) a paper with a thin synthetic resin layer formed thereon and sandblasted and (5) a paper extrusion-laminated with a polypropylene resin by the use of a matte roll. Of these, however, synthetic paper (1) has drawbacks of the resin used being expensive and the manufacturing process comprising many steps, the latter being the case also with synthetic papers (2), (3) and (4), and their manufacturing costs are inevitably expensive. Synthetic paper (5) is easy to manufacture, indeed, but it cannot well meet the requirements for a recording paper and is poor in workability due to its tendency to be easily charged electrostatically.

Meanwhile, as a method of imparting visual effect background patterns to a synthetic paper using some synthetic resin film, embossing has been used widely. A common method of embossing, however, consists in preheating a sheetlike material, imparting irregular patterns to its surface by the use of an embossing roll with given patterns engraved therein and winding after cooling. This process for manufacturing the waterproof recording material having ground patterns comprise two steps, this making the manufacturing process complicated and the productivity low.

Nowadays, various gift cards such as gift certificates, beer cards and white shirt cards, capital or fund securities (investment securities) such as stock securities, debentures and government bonds, monetary certificates such as bills and checks, goods certificates such as cargo exchanges and warehouse bonds, various admission tickets, and cards such as ID cards and prepaid cards are used widely and in large quantities and they are no longer dispensable in our daily life.

Of these, the gift certificates, cards and the like allow users to obtain goods or service without carrying cash, and allow member stores to save effort and expense for sales promotion and bill collecting. Also card issuing firms can have commissions and banks can anticipate increase of deposits as well as loans and omission of credit survey, thus the system being profitable for all those concerned. Since such system can work, needless to say, on the premise of social credit, however, illegal use of false or altered cards and the like is truly fatal and crimes involving illegal use of such cards have come to be a graver social problem in proportion to the spread of the system. In the case of the aforementioned capital securities or monetary certificates, in particular, the amounts of money are quite large and the influence that the illegal use or abuse of such certificates and the like has on the society is quite grave. For prevention of such illegal use, there is a method of using the so-called watermark, but this method cannot be easily used since it requires a highly advanced technique and, further, there are legal limitations set therefor. As safeguard against illegal use of cards and the like, the insurance system is widely used but this is an ex post facto conduct having nothing to do with prevention of crimes such as illegal use or abuse of cards and the like.

SUMMARY OF THE INVENTION

It is an object of the present invention to cheaply and easily provide a waterproof recording material excellent in recording property and waterproofness and having background patterns with imparted stepwise variation of visual effects surface properties.

Another object of this invention is to cheaply and easily provide a security material for easy true/false discrimination of valuable securities and the like and for ensuring against illegal use or abuse thereof such as altering and falsifying.

Further objects and features of this invention will become apparent to those skilled in the art from reading of the detailed description of the invention below.

After extensive and intensive studies in order to attain the foregoing objects, the present inventors discovered a waterproof recording material having background patterns by imparting visual effect background patterns to the surface of a film of a resin composition comprising a thermoplastic resin and a filler.

BRIEF DESCRIPTION OF THE DRAWINGS

FIG. 3 is a cross-sectional view of a portion of one embodiment of a waterproof recording material according to the invention, FIG. 4 is a top plan view of the embodiment of a waterproof recording material as shown in FIG. 3 which illustrates the visual effect background pattern, and FIG. 5 is a photomicrograph of the top of the embodiment of a waterproof recording material of FIG. 3 which also illustrates the visual effect background pattern.

DETAILED DESCRIPTION OF THE INVENTION

Figure 1:
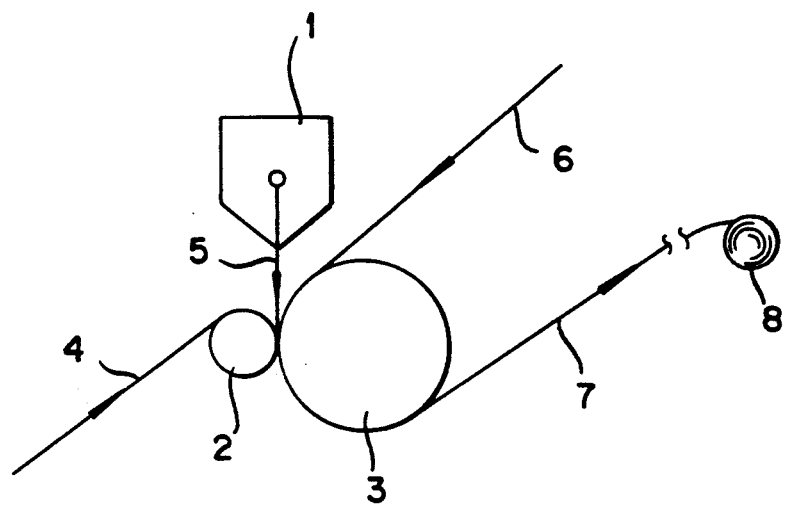
FIG. 1 and FIG. 2 are schematic views showing apparatuses used in the embodiments of this invention.

The present invention relates firstly to a waterproof recording material having visual effect background patterns characterized in that the background patterns are imparted to the surface of a film of a resin composition comprising a thermoplastic synthetic resin and a filler.

Secondly, it relates to a manufacturing method of the waterproof recording material having visual effect background patterns, wherein the resin composition prepared by mixing the thermoplastic resin with the filler is extruded in film form in between a substrate and the patterned side of a sheet having the background patterns, the sheet is separated after pressing and cooling and then the sheet's pattern is transferred onto the surface of the film of the resin composition.

Thirdly, it relates to another manufacturing method of the waterproof recording material having background patterns, wherein the resin composition as the mixture of the thermoplastic synthetic resin with the filler is extruded onto the substrate in film form and after pressing and cooling by applying a cooling roll having the patterns on the resin composition side and thus the patterns of the cooling roll are transferred onto the surface of the film of the resin composition.

The visual effect background patterns referred to in the present invention range from those having strong lusters without any irregularities to those with matte (gradation) effects having irregularities and include patterns, characters, letters or symbols formed by combining various stepwise degrees of luster and tone as well as patterns of veneers, Japanese papers, leathers, woven fabrics and the like.

As recording materials referred to in the present invention, there are those to be written or printed on directly and those to be coated with any desired chemical according to the intended recording method (for instance, electrostatic recording, heat-sensitive recording, pressure-sensitive recording and sublimation transfer recording) but present invention is applicable to the both types. Those to be written or printed on directly are generally higher in commercial value featuring beautiful ground patterns and good for such uses as a poster, standing signboard, sticker, catalogue, pamphlet, calendar, map, picture book, guide book, golf score card, consultation ticket, name card, post card, bag for light packaging, label, composite container, shopping bag, envelope, letter paper, coaster, menu, book cover, valuable securities, various cards and in-mold sheet.

Since this type of back ground patterns cannot be duplicated by an electrostatic recording method or the like, imitations can easily be discriminated from originals and are thus useful for false/true discrimination or for preventing altering or falsifying attempts.

When a paper is coated with a chemical, it is possible to obtain a recording paper of the desired property with the chemical's wettability and the fixing property adjusted according to the intended back ground patterns.

It is also possible to apply toning, metallizing or the like to the film layer having back ground patterns for further improvement of the recording paper's decorative effect.

The thermoplastic resin of the present invention is a synthetic resin which has waterproof property and is laminatable and any other available resins may be selected according to the desired physical properties. When a substrate is used, its topside and underside may consist of different resins. It may preferably be a polyolefin type resin or a polyester type resin. As the polyolefin type resin, there may be included polyethylene, polypropylene, poly-4-methylpentene-1 and their copolymers, their copolymers with other monomers, mixtures thereof or the like. As the polyester type resin, there may be included polyethylene terephthalate, polybutylene terephthalate, these with the acid and/or glycol components of their monomers altered, their copolymers, mixtures thereof or the like. For improving the recording property of the thermoplastic resin, it is also possible to mix a functional group-containing resin or the like. As the functional group-containing resin, there may be included thermoplastic resins containing maleic acid anhydride, acrylic acid, itaconic acid, sulfonic acid, amine, amide or the like.

The filler of the present invention includes inorganic as well as organic matters in granular form, fibrous form or the like.

The object of mixing the inorganic filler is firstly to vaporize the water adhering to the inorganic filler or its crystallization water by means of the heat applied for lamination and to form voids using the thermal decomposition gas of the inorganic filler itself. As these voids, preferred are fine bubbles continuous or independent, these bubbles improving the chemical's coating and fixing property in the after-treatment and, in particular, improving the thermal insulation and cushioning property of the substrate in the case of a recording paper of the heat sensitive type. The second object of the same is to impart hydrophilic property for enhancing the wettability of the film surface for consequent improvement of printability or coating property. The third object is to lower the electrostatic charging property by imparting hydrophilic property for improving handling workability. And the fourth object is to make the film layer white and opaque for imparting a natural paper-like feel as well as for intensifying the contrast of the recorded image against the ground tone. The object of mixing the organic filler, in particular, is also for void formation as mentioned above but here it is done by means of phase separation or organic filler decomposition gas. Another advantage of using the organic filler is weight-saving because it lowers the specific gravity of the resin mixture than when the inorganic filler is used.

As the inorganic filler used in the present invention there may be included, among others, calcium carbonate, silica, mica, talc, clay, zeolite, alumina, magnesia, titanium oxide, tin oxide, glass powder, barium sulfate, bentonite, diatomaceous earth, gyps and sodium bicarbonate. These may be used singly or in combination of two or more. As the organic filler, there may be included, among others, urea resin, phenolic resin, thermosetting polyester resin, silicone resin, polystyrene type resins and methylmethacrate resin. These may be used singly or in combination of two or more according to the intended use. The filler mixing ratio may preferably be in a range of 0.5–60 weight %; if it is less than 0.5 weight %, the void formation enhancing effect is insufficient, while, if it is in excess of 60 weight %, it interferes with laminating efficiency. The mixing ratio is determined as necessary according to the laminating temperature, gas generation rate and the like.

According to the present invention, preferred is use of a proper compatibility-improver. The compatibility-improver used in this invention is for making uniform and minute the voids formed by acting among the thermoplastic synthetic resin constituting the resin composition, the filler and the gas forming voids. As compatibility-improver, preferred are, besides surfactants of silicone or fluorine type, high-polymer propylene oxide, polystyrene sodium sulfonate, functional group-containing olefin resins (maleic acid anhydride copolymer, acrylic acid type copolymers, itaconic acid copolymer and the like), ethylene vinyl alcohol copolymer, alpha-olefin addition product of polymethylhydrogen siloxane and the like. Selection of the kind and mixing ratio of the compatibility-improver are to be made according to the mixing proportions of the ingredients constituting the resin composition, HLB value et cetera. Some compatibility-improvers are known to have electrostatic charging preventing effect and thermal decomposition-induced void forming capability. The mixing ratio is preferably in a range of 0.1–15 weight %; at less than 0.1 weight % its effect is insufficient, while at more than 15 weight % the extrusion workability is adversely effected.

According to the present invention, addition of a water absorbent resin to a resin composition further improves the hydrophilic property of the film layer and also void formation is enhanced by thermal decomposition, this being effective for improvement of wettability of film layer surface as well as of workability due to decrease of the electrostatic charging.

As the water absorbent resin used in the present invention, there are included, among others, commercially available resins of starch type, acrylic acid type and the like, choice of which depends on compatibility with the constituent ingredients of the resin composition et cetera.

According to the present invention, it is feasible to mix such common additives as an antistatic agent and antioxidant in the resin composition.

The substrate, if it is used in the present invention, comprises a pulp paper, coated paper, size press paper, super-calendered paper, synthetic paper, nonwoven fabric, laminate paper, synthetic resin film, metal foil, metal vapor deposited film and laminates thereof. Choice of the proper substrate depends on the intended use and purpose. For instance, although it is natural that the irregularities of the back ground patterns is required to be small with recording papers of high surface smoothness such as of the sublimation transfer type, the substrate is also preferred in such a case to employ a coated paper, size press paper, calendered paper, synthetic resin film and the like.

The back ground patterns of the present invention are prepared by means of a luster difference provided by the use of irregularities of preferably 40 μm or less, and more preferably 0.1–40 μm; if it is less than 0.1 μm, true/false discrimination or judgment for prevention of altering or falsification is difficult in visible light and also the manufacturing cost is high because of the high precision required, while if it is more than 40 μm the increased irregularities difference makes writing or printing difficult. Judged generally from the ease of true/false discrimination, of discovering altering or falsification, printability and of manufacture all taken into consideration, a range of 2–10 μm is particularly suitable. The back ground patterns may be provided all over the film surface regularly or irregularly or may as well be provided at proper intervals.

A portion of a waterproof recording material 30 is shown in cross-section in FIG. 3, the material comprising film 32 of a resin composition comprising a thermoplastic synthetic resin and a filler, and substrate 34 of paper or the like. The surface of film 32 opposed from substrate 34 has the visual effect background patterns in the form of surface irregularities 36 as described above. It should be recognized that the size of the surface irregularities 36 as well as the thicknesses of film 32 and substrate 34 have been exaggerated for the purposes of clarity.

As is shown in FIG. 4 and 5, the visual, effect background patterns are formed by linear irregularities. FIG. 5 is a photomicrograph of a pattern corresponding to that shown in FIGS. 3 and 4.

The waterproof recording paper having back ground patterns of the present invention is obtainable by an extrusion method which facilitates the manufacture of the waterproof recording paper as well as formation of the background patterns, this being highly advantageous.

A first manufacturing method consists in extruding a resin composition as a mixture of a thermoplastic synthetic resin with a filler in film form in between a substrate and the patterned side of a sheet having patterns (hereinafter called a matrix sheet) and then transferring the patterns of the matrix sheet onto the surface of the resin. composition by separating the matrix sheet after pressing and cooling. This is the so-called sandwich laminate system of the extrusion laminate method. In this case the resin composition and the matrix sheet have to be releasably combined. For such combination, when as the thermoplastic synthetic resin as the main ingredient of the resin composition, polyethylene resin, polypropylene resin or the like is used, it is advisable to choose polyester type resin, poly-4-methylpentene-1 resin, polyvinyl chloride resin or the like as the resin for the matrix sheet. There is, however, no particular limitation about the matrix sheet material and various resin sheets (including foams), films, Japanese papers, veneers, leathers, woven fabrics, nonwoven fabrics, metal foils, metal vapor deposited films, laminate papers and the like are usable, and it is also possible to do silicone treatment or the like for improving releasability of the extruded resin composition. The patterns of the matrix sheet may as well be produced by printing besides the conventional embossing. The patterns by printing may be created by proper combination of quantities and tones of the inks used (the inks include, besides pigments and the like, other powders and granules used or printing of metal powders, ceramic powders, metal oxides and the like), namely, those particle size, form, degree of dispersion et cetera being varied freely, the patterns are created by any known printing method for combination of luster and tome in various stages.

This manufacturing method features the possibility of representing broad stereo feeling and perspective feeling from macro and dynamic ones to micro and delicate ones. Also, this method is suited for variegated small lot production because change to the desired background patterns can be made by simply replacing the matrix sheets.

A second manufacturing method consists in extruding the resin composition as a mixture of a thermoplastic synthetic resin with a filler in film form onto the substrate and then passing and cooling the same by the use of a cooling roll having patterns on the resin composition side to thereby have the patterns of the cooling roll transferred onto surface of the resin composition film layer. In this method, the patterns of the cooling roll may be of any desired ones and the patterns produced may not only have a visual effect but also may be of importance for adjusting the surface property of a recording paper. Moreover, this method is better suited for mass production since progressive lotwise deterioration (change) of the patterns is extremely small as compared with the aforementioned first manufacturing method.

A third manufacturing method consists in first making the resin composition containing a filler in film form by any method of the present invention or the like and then having it laminated with the desired substrate (by extrusion sandwich method, dry laminate method, wet laminate method et cetera) or having it stuck to the surface thereof by the use of adhesive or the like. In such a case, the manufacture can be facilitated by using a release paper as substrate. By this manufacturing method, it is possible to have the resin composition made into a film having any desired patterns and to have it laminated with or stuck to a proper substrate according to the intended use or purpose.

For instance, such film may be stuck to the surface of a post card or a notebook cover for imparting ground patterns and/or waterproofness.

Also, this method is applicable even when the aforementioned first or second manufacturing methods are not usable, for instance, when the processing temperature of the filler-containing resin composition is too low, when it is not stuck well to the substrate or when in the first manufacturing method, releasing from the matrix sheet is incompatible with sticking to the substrate.

When a substrate is used in connection with the present invention, the background patterns may be provided on one or both sides thereof arbitrarily. The use of the substrate has a great advantage of the background patterns not setting off (showing) on the back side, whereas it is inevitable when the conventional embossing method is used. It is therefore possible to provide the background patterns on both sides, and in such a case it is, needless to say, possible to provide different background patterns on both sides.

Although, as mentioned above, the ground patterns of the present invention are aimed at producing a visual effect and adjustment of the surface properties of a recording material. Of the surface properties or performances, in particular, surface wettablility, coating property, coating fixing behavior et cetera can be improved by corona discharge treatment of the ground pattern side.

The present invention is described below in greater detail by way of examples and control examples but, needless to say, this invention is in no way limited thereby.

EXAMPLE 1

70 weight % of polypropylene resin "LA-221" (Mitsui Petrochemical) as a thermoplastic synthetic resin and 30 weight % of calcium carbonate "Whiton SB (Red)" (Shiraishi Calcium) as a filler were dry-blended, and the blend was melt-kneaded (die outlet temperature: 220° C.) by a two-shaft kneader "PCM-30" (Ikegai Tekko) and then pelletized.

The pelletized resin composition was dried, fed to a T-die extruder (diameter: 40 mm, T-die temperature: 209° C.) (1) and then extrusion-laminated (thickness: 30 $\mu$m, by the use of a cooling mirror roll (3)) onto a quality paper (basis weight: 66.3 g/m$^2$)(4) as a substrate. At that time, a 25 $\mu$m polyester printed sheet (matrix sheet)(6) arranged along the cooling mirror roll (3) such that the side with printed walnut grain patterns is in contact with the resin composition (5) was pressed (pressure: 12 kg/cm$^2$) by a press roll (2) with the aforementioned resin composition (5) in between (generally called "polysand") and after cooling by the cooling mirror roll (3), the resulting laminate (printed sheet/resin composition/quality paper)(7) was wound together by a winder (8).

From the wound laminate (7), the printed sheet (6) was peeled off the surface of the resin composition and the intended waterproof recording material with the background patterns transferred accurately onto the surface of the resin composition (5) was thus obtained.

The background pattern side of the waterproof recording material having background patterns was treated by corona discharge (30 W/m$^2$/min) to adjust the surface wetting index to 50 dyne/cm (as determined with a wettability indicator) and then its printability was tested by offset printing. The result showed that the ink fixing property on the background pattern side was favorable.

When the printed matter was electrostatically copied, the printed detail alone was copied with the background patterns uncopied.

EXAMPLE 2

Figure 2:
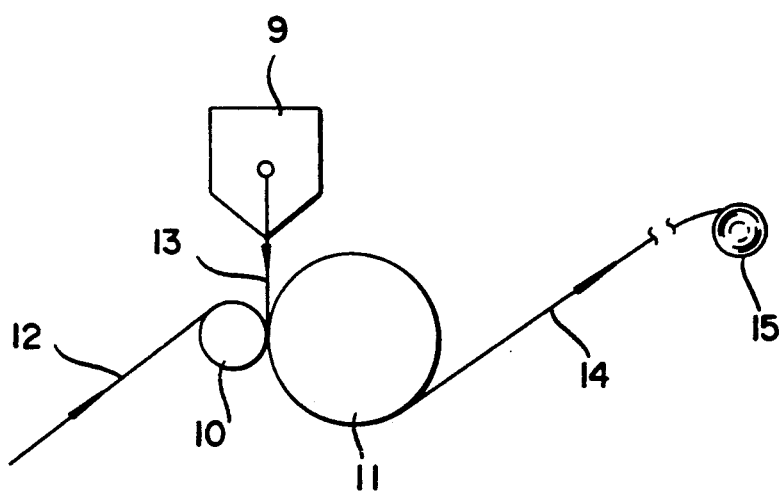

The resin composition in pellet form was prepared in the same way as in Example 1 and after drying was fed into a T-die extruder (9) as shown in FIG. 2 and was laminated on a quality paper (basis weight: 66.3 g/m$^2$) (12) under the same conditions as in Example 1. In this case, however, the matrix sheet (6) was not used unlike in Example 1, a cooling roll (11) having hairline patterns was used instead of the cooling roll (3) and after pressing by a press roll (10) and cooling by the cooling roll (11), the resulting laminate (resin composition/quality paper) (14) was wound by a winder (15).

The pattern side of the wound waterproof recording material having back ground patterns was treated by corona discharge (30 W/m$^2$/min) to have its surface wetting index adjusted to 52 dyne/cm (as determined with the wettability indicator) and, thereafter, it was coated with a common FAX heat-sensitive chemical and dried. The heat-sensitive chemical was found well fixed to the aforementioned pattern side, its developing property being also favorable.

The waterproof recording material with back ground patterns obtained in Example 2 was also good in writeability by a pencil or water color felt pen.

EXAMPLE 3

The resin composition in pellet form was prepared in the same way as in Example 1, was fed after drying into the T-die extruder (9) as shown in FIG. 2 and was laminated on a silicone-coated paper (composition: silicone/PE (20 $\mu$m)/craft paper (basis weight: 75 g/m$^2$ (12) under the same conditions as in Example 1. In this case, however, the silicone-coated paper (12) was arranged with its silicone-coated side in contact with a molten film (13) of the resin composition, the matrix sheet (6) of Example 1 was not used, the cooling roll (11) with hairline patterns was used for cooling and after pressing by the press roll (10) and cooling by the cooling roll (11), the resulting laminate (resin composition/silicone-coated paper) (14) was wound by the winder (15).

The pattern side of the laminate (14) obtained in the above-mentioned way was subjected to corona discharge (30 W/m$^2$/min) and after adjusting the surface wettability index to 50 dyne/cm (as determined with the wettability indicator) and cutting to the desired size (post card size) the resin composition was peeled off the silicone-coated paper (12) and it was stuck to the back side of a New Year's card using a pressure sensitive adhesive double coated tape with the back ground pattern side out. The New Year's card so prepared, waterproof as it was, appeared to be of a high quality because of the imparted back ground patterns and was good for writing by a pencil or ball-point pen, and multi-color offset printing, too, being feasible.

EXAMPLE 4

A resin composition consisting of 76 weight % of polyethylene resin "M-14" (Mitsui Petrochemical) and calcium carbonate "Whiton SB (Red)" was laminated on the nonlaminated side of the laminate obtained in Example 2 (T-die temperature: 330° C., thickness: 30 μm, cooling roll: cooling mirror roll) and then the back ground pattern side was treated by corona discharge. When the treated back ground pattern side was coated with the heat sensitive chemical and dried, the adhesion of the heat sensitive chemical and its developing performance were both good, and the writability and waterproofness, too, were satisfactory.

EXAMPLE 5

65 weight % of polypropylene resin "LA-221" (Mitsui Petrochemical) as a thermoplastic synthetic resin, 10 weight % of polypropylene-maleic acid graft polymer "Admer QE-050" (Mitsui Petrochemical) as a printability improver and dispersant, and 25 weight % of calcium carbonate "Whiton SB (Red)" (Shiraishi Calcium) as a filler were dry-blended, and the blend was melt-kneaded (die outlet temperature: 220° C.) by a two-shaft kneader "PCM-30" (Ikegai Tekko) and then pelletized.

The pelletized resin composition was dried, fed to a T-die extruder (diameter: 40 mm, T-die temperature: 290° C.) (1) and then extrusion-laminated (thickness: 30 μm, by the use of cooling mirror roll (3)) onto a quality paper (basis weight: 66.3 g/m$^2$) (4) as a substrate. At that time, a 25 μm polyester printed sheet (matrix sheet) (printing ink thickness: 5 μm) (6) arranged along the cooling mirror roll (3) such that the side with printed trademark as back ground patterns is in contact with the resin composition (5) was pressed (pressure: 12 kg/cm$^2$) by the press roll (2) with the aforementioned resin composition (5) in between (generally called "polysand") and after cooling by the cooling mirror roll (3) the resulting laminate (matrix sheet/resin composition/quality paper) (7) was wound together by the winder (8).

From the wound laminate (7) the matrix sheet (6) was peeled off the surface of the resin composition and the intended security recording material with the trademark transferred accurately onto the surface of the resin composition (5) was obtained. The depth of the back ground patterns was 2–4 μm.

The back ground pattern side of the recording material having back ground patterns was treated by corona discharge (30 W/m$^2$/min) to adjust the surface wetting index to 50 dyne/cm (as determined with the wettability indicator) and then its printability was tested by offset printing. The result showed that the ink fixing property on the back ground pattern side was favorable.

When the printed matter was electrostatically copied (color copy) the ground patterns were not copied at all and it was confirmed that falsification of any document by copying was impossible.

The printed material prepared in the above way is specifically suitable for preparation of securities, tickets and the like.

EXAMPLE 6

With the printed material having ground patterns prepared in Example 5, an altering attempt was made by scraping off part of the print by a safty razor but the attempt was apparent with the ground patterns deformed and damaged.

EXAMPLE 7

A resin composition in pellet form was prepared in the same way as in Example 5 and after drying was fed into the T-die extruder (9) as shown in FIG. 2 and was laminated onto a quality paper (basis weight: 127.9 g/m$^2$) (12) as a substrate under the same conditions as in Example 5. In this case, however, the matrix sheet (6) of Example 5 was not used, the cooling roll (11) having the desired polka dots patterns (8 μm deep by embossing) instead of the cooling roll (3) and, after pressing by the press roll (10) and cooling by the cooling roll (11), the resulting laminate (resin composition/quality paper) (14) was wound by the winder (15). The depth of these back ground patterns were 5–7 μm.

The recording material having back ground patterns thus obtained was inserted into the T-die extruder (diameter: 40 mm, T-die temperature: 290° C.) (9) such that the side without the ground patterns (quality paper side) is in contact with the aforementioned resin composition (13) for extrusion lamination on the side [thickness: 30 μm, cooling roll: cooling matte roll (11)] and the recording material with the back ground patterns on both sides was wound by the winder (15).

The back ground pattern sides (both sides) of the recording material wound was treated by corona discharge (30 W/m$^2$/min) for adjusting the surface wettability index to 52 dyne/cm (as determined with the wettability indicator).

Its printability was tested by offset printing and the result showed that the ink fixing property was good on both sides. Copy test by electrostatic recording (color copy) method, too, was the same as in Example 5 and it was confirmed that falsification was impossible.

The obtained recording material having back ground patterns was satisfactory in writeability by a pencil or water color felt pen, also being favorable in wettability of the matte pattern side with respect to heat-sensitive coating liquor, fixing property and developing property thereof. The depth of the polka dots patterns was 5–7 μm and there was seen no adverse effect of providing the background patterns on both sides.

EXAMPLE 8

95% weight % of modified polypropylene resin "G-5116" (Eastman Kodak) as a thermoplastic synthetic resin and 5 weight % of silica "P-526" (Mizusawa Kagaku) as a filler were pelletized as a resin composition in the same way as in Example 5 and after drying was fed to the T-die extruder (9) as shown in FIG. 2 and was extrusion laminated (thickness: 200 μm) on the silicone coated paper (composition: silicone/polyethylene (20 μm)/craft paper (basis weight: 75 g/m$^2$) (12). In this case, the silicone-coated paper (12) was so disposed that the silicone-coated side is in contact with the molten film (13) of the resin composition, the matrix sheet (6) in Example 5 was not used, the cooling roll (11) having character patterns (8 μm deep by embossing) was used, and after pressing by the press roll (10) and cooling by the cooling roll (11), the resulting laminate (resin composition/silicone-coated paper) (14) was wound by the winder (15).

From the laminate (14) so obtained the silicone-coated paper (12) was peeled off and a security sheet having background patterns (6–7 μm deep) was obtained. The pattern side of the sheet obtained was treated by corona discharge (30 W/m$^2$/min) to adjust the surface wetting index to 54 dyne/cm or more (as determined with the wettability indicator) and then its printability was tested by offset printing, this followed by a copy test by electrostatic recording (color copy) method. The result showed that printability was satisfactory and that falsifying attempt was impossible.

The security recording materials as mentioned above are particularly suited for uses required a high mechanical strength and waterproofness.

EXAMPLE 9

85 weight % of polypropylene resin "LA-221" and 15 weight % of acrylic acid graft polypropylene resin "POLYBOND PB-1001" (BP Performance Polymer Inc.) as a functional group-containing resin were dry-blended, and the blend was fed to the T-die extruder (diameter: 40 mm, T-die temperature: 280° C.) (9) and further processing was carried out in the same way as in Example 4 using the cooling roll (11) having hairline patterns (15 μm deep by embossing), and the resulting laminate (resin composition 200 μm thick/silicone-coated paper) (14) was wound by the winder (15).

From the laminate (14) so prepared the silicone-coated paper (12) was peeled off and a 12-13 μm thick sheet substrate for prepaid cards was obtained. The pattern side of this sheet was subjected to corona discharge (30 W/m$^2$/min) to adjust the surface wetting index to 54 dyne/cm (as determined with the wettability indicator) and then was coated with a heat-sensitive chemical. The adhesion and developing performance of the heat sensitive chemical were both good. In the copy test by the electrostatic recording (color copy) method, the hairline patterns could not be copied, falsification by copying being thus impossible, and it thus turned out to be as good as a sheet substrate for prepaid cards.

Thus, according to the present invention, it is possible to provide a waterproof recording material having ground patterns, which can impart various stages of surface properties and visual effects cheaply as well as easily.

Moreover, these background patterns cannot be copied by any electrostatic recording method, this making falsification attempt by copying totally impossible. Also, since such background patterns are made by intricate combination of micro-irregularities, any altering attempt by partial scraping off can easily be detected by checking the ground patterns for deformation and/or damage, hence it is quite useful for facilitating true/false discrimination of value securities and the like as well as for prevention of illegal use or abuse of the same by altering et cetera. Further, the recording material of the present invention is also waterproof and has a high mechanical strength, being thus ideal for use as a material for valuable securities and the like which are transferred rather frequently.

What is claimed is:

1. A waterproof recording material having visual effect background patterns, the material including a film of a resin composition comprising a thermoplastic synthetic resin and a filler, a surface of the film having the visual effect background patterns thereon which are luster differences produced by irregularities of not more than 40 um on the surface of the film.

2. A waterproof recording material according to claim 1, further including a substrate laminated to the film having the visual effect background patterns.

3. A waterproof recording material according to claim 1, wherein the thermoplastic synthetic resin is a polyolefin type resin.

4. A waterproof recording material according to claim 1, wherein the thermoplastic synthetic resin is a polyester type resin.

5. A waterproof recording material according to claim 2, wherein the substrate is paper.

* * * * *

UNITED STATES PATENT AND TRADEMARK OFFICE
CERTIFICATE OF CORRECTION

PATENT NO.:     5,188,395
DATED      :    February 23, 1993
INVENTOR(S):    KAWAHARA et al.

It is certified that error appears in the above-identified patent and that said Letters Patent is hereby corrected as shown below:

On the cover page, Item [30], please change the second priority date from "October 4, 1989" to --April 10, 1989--.

Signed and Sealed this

Nineteenth Day of July, 1994

Attest:

BRUCE LEHMAN

*Attesting Officer*         *Commissioner of Patents and Trademarks*